United States Patent [19]

Schramm

[11] Patent Number: 4,789,175
[45] Date of Patent: Dec. 6, 1988

[54] VEHICLE FOR THE DISABLED

[76] Inventor: Siegfried K. H. Schramm, Schenkendorfstr. 1, 3208 Giesen, Fed. Rep. of Germany

[21] Appl. No.: 78,920

[22] Filed: Jul. 28, 1987

[30] Foreign Application Priority Data

Jul. 31, 1986 [DE] Fed. Rep. of Germany ....... 3625955
Sep. 9, 1986 [DE] Fed. Rep. of Germany ....... 3630687

[51] Int. Cl.⁴ ............................................. B60D 1/04
[52] U.S. Cl. .................... 280/289 WC; 280/242 WC; 280/282; 297/DIG. 4
[58] Field of Search ............... 180/13; 280/242 WC, 280/289 WC, 282, 492, 496, 201, 202, 204, 267; 297/DIG. 4

[56] References Cited

U.S. PATENT DOCUMENTS 1,661,257 3/1928 Kirch .................................. 280/202
1,962,013 6/1934 Griffoul ............................. 280/202
2,482,585 9/1949 Hauptman ......................... 280/202

*Primary Examiner*—John J. Love
*Attorney, Agent, or Firm*—Toren, McGeady & Associates

[57] ABSTRACT

A vehicle for the disabled comprising a wheel-chair with seat and back-rest, on the chassis of which two coaxial rear wheels and at least one front wheel are mounted, a cycle frame arranged behind the wheel-chair with a drive wheel drivable by means of pedals, a saddle and coupling device, mounted pivotably on a steering bearing of the cycle frame about a substantially vertical pivot axis, for the detachable connection of the wheel-chair with the cycle frame, the coupling device having at least one cross-member extending transversely of the longitudinal axis of the cycle frame, which cross-member is securable to the wheel-chair chassis through two coupling elements spaced from one another in the transverse direction and supports the forward end of the cycle frame on the chassis of the wheel-chair, is characterized in that the steering bearing (35) carrying the coupling device is connected with the cycle frame (2) through a joint (42) with substantially horizontal pivot axis but otherwise substantially rigidly in rotation.

16 Claims, 2 Drawing Sheets

VEHICLE FOR THE DISABLED

The invention relates to a vehicle for the disabled, comprising a wheel-chair with seat and back-rest, on the chassis of which there are mounted two coaxial rear wheels and at least one front wheel, a cycle frame arranged behind the wheel-chair with a drive wheel drivable by means of pedals, a saddle and a coupling device mounted pivotably on a steering bearing of the cycle frame about a substantially vertical pivot axis for the detachable connection of the wheel-chair with the cycle frame, the coupling device having at least one cross-member extending transversely of the longitudinal axis of the cycle frame, which cross-member is securable to the wheel-chair chassis through two coupling elements spaced from one another in the transverse direction and supports the front end of the cycle frame on the chassis of the wheel-chair.

Not only old and frail persons are dependent upon the wheel-chair, but also many young persons are tied to the wheel-chair by reason of a disability or an accident. Frequently it is necessary or desirable for the wheel-chair passenger to be accompanied by a helper. Conveying of the helper together with a wheel-chair passenger is possible as a rule only if the helper pushes the wheel-chair or walks beside it.

In order now to make it possible for associates or friends of a wheel-chair passenger to travel and undertake outings together with him, it has already been proposed to connect a cycle with a wheel-chair. For this purpose a wheel-chair manufactured specifically for that purpose and a cycle were connected so that they formed a carriage which ran on three wheels at the front. For this purpose the wheel-chair is tilted slightly backwards. This carriage is very costly and requires the wheel-chair passenger to purchase a second wheel-chair.

It is a disadvantage of this known device that a specially manufactured wheel-chair must be used and that the wheel-chair regularly used by the wheel-chair passenger cannot be connected with a cycle.

Furthermore from DE-OS No. 3,303,218 a tricycle for conveying persons is known which consists of a wheel-chair to which a cycle rear part is coupled through a pivot joint and a connection element. In this case the coupling takes place in a manner in which the wheel-chair is tilted to the rear. This however makes access to this carriage difficult. If the wheel-chair passenger first climbs into the wheel-chair, the cycle rear part is pressed upwards and pivoted forwards by way of the pivot joint. On the other hand the wheel-chair passenger cannot climb into the wheel-chair if the cyclist is already sitting on the cycle and the wheel-chair is therefore inclined to the rear.

Now it was the problem of the invention to produce a carriage with which a wheel-chair passenger and an escort can travel together, in which an ordinary commercial wheel-chair can be used and which can easily be assembled. It was further an object of the invention to produce a vehicle which is easy to operate and which is stabilised both with and without loading.

This problem is solved by a vehicle for the disabled comprising a wheel-chair with seat and back rest, on the chassis of which two coaxial rear wheels and at least one front wheel are mounted, a cycle frame arranged behind the wheel-chair with a drive wheel drivable through pedals, a saddle and a coupling device, mounted pivotably about a substantially vertical pivot axis on a steering bearing of the cycle frame, for the detachable connection of the wheel-chair with the cycle frame, while the coupling device has at least one cross-member extending transversely of the longitudinal axis of the cycle frame which is securable to the wheel-chair chassis through two coupling elements with spacing from one another in the transverse direction and supports the forward end of the cycle frame on the chassis of the wheel-chair, which is characterised in that the steering bearing carrying the coupling device is connected with the cycle frame through a joint with substantially horizontal pivot axis but otherwise substantially rigidly in rotation.

The assembling of the vehicle for the disabled in accordance with the invention is simple and can be carried out with practically any wheel-chair.

As wheel-chair there can be used any ordinary commercial wheel-chair having two coaxial rear wheels and at least one front wheel. It has a chassis which holds the seat and back rest and has vertical struts. In order to facilitate transport for preference a wheel-chair which is collapsible in the axial direction of the rear wheels will be used.

To this wheel-chair a cycle frame is secured. This cycle frame includes a rear wheel fork which carries a hub and a drive wheel drivable by means of pedals, a saddle support tube carrying the saddle, and a pedal bearing with pedals. The drive wheel is preferably driven through a chain drive. The steering bearing on which the coupling device is situated is connected with the cycle frame by way of a joint with substantially horizontal pivot axis, which however is otherwise substantially rigid in rotation.

The arrangement consisting of the joint and the steering bearing connected with it and carrying the coupling device will hereinafter be called cross joint. The cross joint can be situated directly on the cycle frame or can be connected with the cycle frame by one or more connection tubes. The cross joint is preferredly connected with the cycle frame by an arm. Then the arm carries at its one end the joint with substantially horizontal pivot axis, which again is connected with the steering bearing, which has a substantially vertical pivot axis, and is securable with the other end on the rear wheel frame in the region of the pedal bearing.

In an especially preferred form of embodiment the cross joint is arranged so that it is situated in front of the axis of the rear wheels of the wheel-chair, in the direction of travel. In the case of this arrangement the position of the vehicle for disabled persons according to the invention is especially stable, even without loading.

The arm connecting the cycle frame with the steering bearing preferably carries a holding device on the end towards the steering bearing. This holding device is secured to the arm and consists for preference of a cross spar extending transversely of the longitudinal direction of the arm, from which there extend two spars extending in the longitudinal direction of the arm. The joint can be secured on this holding device transversely of the longitudinal direction of the arm. The joint is preferably an intermediate piece rotatably mounted on both sides and firmly connected with the steering bearing.

In a preferred form of embodiment for this purpose ball bearings are situated on both sides of the intermediate piece. For the stabilisation of the position for travelling with the wheel-chair unloaded a stop which limits the downward tilting position of the joint is further preferably arranged on the holding device.

The arm preferably carries at the end remote from the steering bearing a frame coupling which is rigidly couplable with the rear wheel frame. The frame coupling is especially preferably a folding hinge.

In an especially preferred form of embodiment as cycle frame there is used the rear wheel frame of a single-tube folding cycle. In this case the rear wheel frame is connected through an arm with the steering bearing, which has a substantially vertical pivot axis. Then the arm carries the cross joint at its one end and can be secured with the other end to the rear wheel frame in the region of the pedal bearing. At the end remote from the steering bearing the arm preferably carries a frame coupling which is rigidly couplable with the rear wheel frame. The frame coupling is especially preferably a folding hinge.

The cross joint connects the cycle frame with the wheel-chair disengageably through a coupling device. The coupling device is pivotably mounted on the steering bearing of the cycle frame. It consists of at least one cross member extending transversely of the longitudinal axis of the cycle frame. The steering bearing preferably carries two cross members arranged with spacing one above the other. The cross member or members is or are secured to the wheel-chair chassis through two coupling elements each. Here the coupling elements are connected preferably with the vertical struts of the wheel-chair chassis. Lockable forks, brackets or clips serve as preferred coupling elements.

If the coupling device consists of two cross-members articulated to the steering bearing, it is preferred that one of the two cross-members is detachably couplable with two coupling elements to the wheel-chair chassis, while the second cross-member is couplable with two coupling elements to the wheel-chair chassis so that furthermore it is vertically displaceable. Then the lower cross-member lies on an abutment which is situated on the vertical struts of the wheel-chair chassis. As abutment there is especially preferredly used an outwardly hingeable spar which is already provided on ordinary commercial wheel-chairs, serves as foot rest in the pushing of the wheel-chair and is situated in the lower region of the vertical struts.

In a preferred form of embodiment the coupling elements are displaceable in the transverse direction on the cross-member. This has the advantage that the cycle frame is couplable to every wheel-chair irrespective of the distance between the two vertical struts of the wheel-chair chassis.

FIG. 1 shows the elevation of a vehicle for the disabled in accordance with the invention, FIG. 2 shows a section along the line 2—2 in FIG. 1, FIG. 3 shows a preferred form of embodiment of the cross joint, FIG. 4 shows a further preferred form of embodiment of the cross joint.

Figure 1:
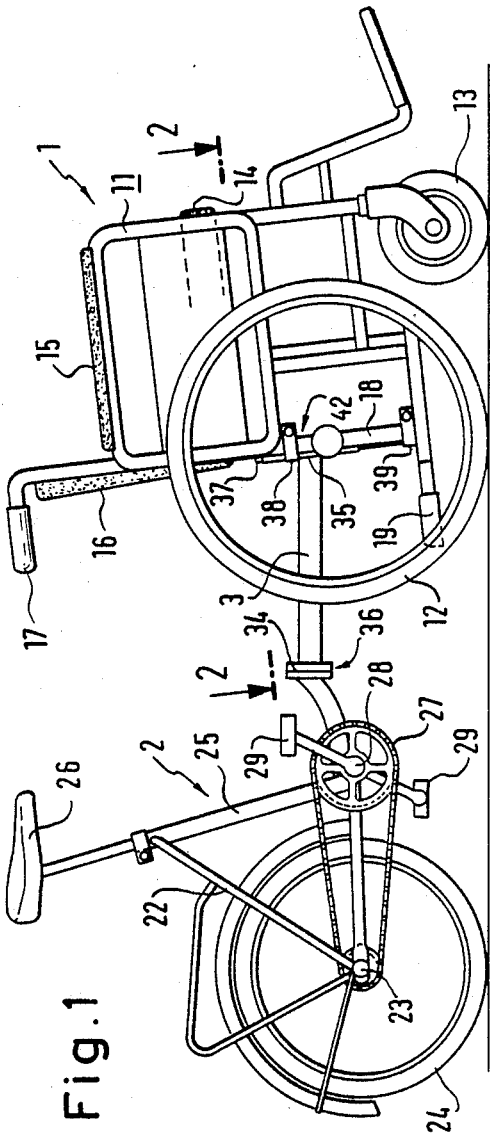
FIGS. 1 to 4 show a preferred form of embodiment of the invention.

FIG. 1 shows a wheel-chair 1, collapsible in the axial direction of the wheels, with seat 14 and back rest 16, on the chassis 11 of which two coaxial rear wheels 12 and two front wheels 13 are mounted. The wheel-chair chassis 11 has two arm rests 15 and two vertical struts 18. In the lower region of the vertical struts there are outwardly hingeable foot rests 19. On the upper end of the seat 14 there are two handles 17. A cycle frame 2 consisting of a rear wheel fork 22 with a hub 23, with a drive wheel 24 drivable by means of a pedal bearing 28 with pedals 29 and a chain drive system 27, a saddle 26 seated on a saddle carrier tube 25, is arranged behind the wheel-chair 1. The substantially vertically mounted steering bearing 35 with a ball bearing 37 is connected in the region of the pedal bearing 28 with the cycle frame 2 through a frame coupling 36, formed as folding hinge, and an arm 3. The steering bearing 35 is connected with a joint 42. Furthermore two cross-links 38, 39 situated with spacing one above the other are articulated to the steering bearing 35. The cross-links 38, 39 are connected with the vertical struts 18 of the wheel-chair chassis 11 through coupling elements 40. The upper cross-link 38 is fixed detachably with two brackets 40 to the wheel-chair chassis 11, while the lower cross-link 39 is connected with the wheel-chair chassis 11 so that it is vertically displaceable. The lower cross-link 39 rests on the foot rest 19 of the wheel-chair chassis 11.

Figure 2:
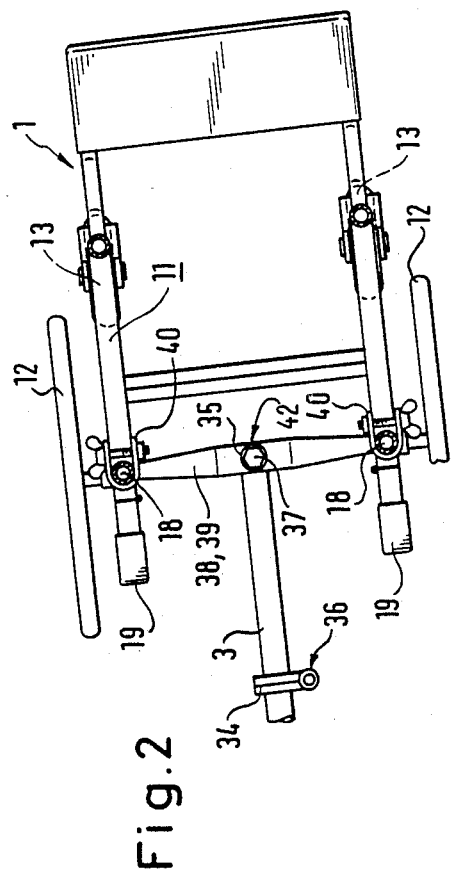

FIG. 2 shows a section along the line 2—2. The cross-links 38, 39 are secured by means of brackets 40 to the vertical struts 18 of the wheel-chair chassis 11 beneath the arm rests 15 and the seat 14. The upper cross-link 38 is detachably secured while the lower cross-link 39, which rests on the foot rest 19, is vertically displaceable. The cross-members 38, 39 are articulated to the substantially vertical steering bearing 35. On the side of the arm 3 remote from the steering bearing there is a joint 36 formed as folding hinge, which is detachably connected with the cycle frame 2 in the region of the pedal bearing 28.

Figure 3:
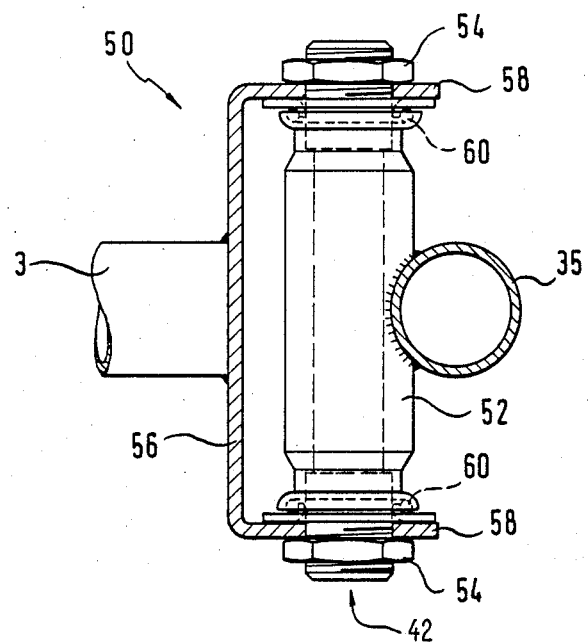

FIG. 3 shows an arm 3 which carries a retaining device 50 on the end towards the steering bearing 35. The retaining device 50 consists of a cross-spar 56 arranged transversely of the longitudinal direction of the arm 3. From this cross-spar 56 two spars 58 extend which are parallel to the longitudinal direction of the arm 3. Transversely of the longitudinal direction of the arm there is situated between the spars 58 an intermediate piece 52 which is secured to the spars 58 by screws and nuts 54. Ball bearings 60 are situated on both sides in the region of the two ends of the intermediate piece 52. The intermediate piece is firmly connected with the steering bearing 35.

Figure 4:
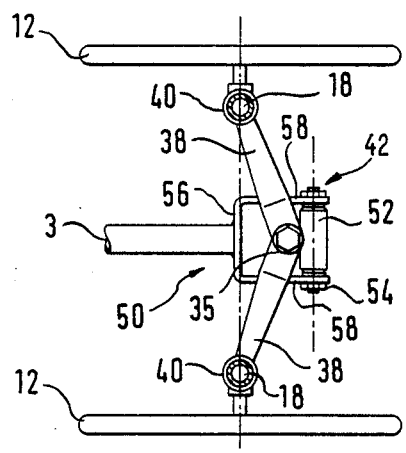

FIG. 4 shows a retaining device 50 which is secured to an arm 3 and carries the steering bearing 35 on the end remote from the arm. The retaining device 50 consists of a cross-spar 56 arranged transversely of the longitudinal direction of the arm 3. From this cross-spar two spars 58 extend parallel to the longitudinal direction of the arm 3. Transversely of the longitudinal direction of the arm 3, between the spars 58 there is a rotatably mounted intermediate piece 52 which is firmly connected with the steering bearing 35. From the steering bearing 35 there issue two cross-members 38 which extend obliquely to the rear in the direction towards the arm 3. On the cross-members 38 there are coupling devices 40 which are secured to the vertical struts 18 of a wheel-chair 1. The intermediate piece 52 and the steering bearing 35 are here situated, in the direction of travel, before the axis of the rear wheels 12 of the wheel-chair 1.

I claim:

1. A vehicle for the disabled, comprising a wheel-chair with seat and back-rest, on the chassis of which there are mounted two coaxial rear wheels and at least one front wheel, a cycle frame arranged behind the wheel-chair with a drive wheel drivable by means of pedals, a saddle and a coupling device mounted pivotably on a steering bearing of the cycle frame about a substantially vertical pivot axis for the detachable connection of the wheel-chair with the cycle frame, the coupling device having at least one cross-member extending transversely of the longitudinal axis of the cycle frame, which cross-member is securable to the wheel-chair chassis through two coupling elements spaced from one another in the transverse direction and supports the front end of the cycle frame on the chassis of the wheel-chair, wherein the steering bearing (35) which carries the coupling device is connected with the cycle frame (2) through a joint (42) with substantially horizontal pivot axis but otherwise substantially rigidly in rotation.

2. Vehicle for the disabled according to claim 1, wherein the steering bearing (35) and the joint (42) are arranged, in the direction of travel, before the axis of the rear wheels of the wheel-chair (1).

3. Vehicle for the disabled according to claim 1 or 2, wherein the joint (42) is an intermediate piece (52) mounted rotatably at both ends, which is securable to the cycle frame (2) and firmly connected with the steering bearing (35), through two coupling elements (54).

4. Vehicle for the disabled according to claim 3, wherein the steering bearing (35) and the joint (42) are connected with the cycle frame (2) through an arm (3).

5. Vehicle for the disabled according to claim 4, wherein the arm (3) carries on the end toward the steering bearing (35) a retaining device (50) to which an intermediate piece (52), rotatably mounted on both sides, is securable through two coupling elements (54), while the intermediate piece (52) is arranged horizontally transversely of the longitudinal direction of the arm (3) and transversely of the vertical pivot axis of the steering bearing (35) and is firmly connected with the steering bearing (35).

6. Vehicle for the disabled according to claim 5, wherein the retaining device (50) includes a cross-spar (56) extending transversely of the longitudinal direction of the arm (3) and two spars (58) extending therefrom in the longitudinal direction of the arm (3).

7. Vehicle for the disabled according to claim 5, wherein a ball bearing (60) is arranged in the region of each of the two ends of the intermediate piece (52).

8. Vehicle for the disabled according to claim 1, wherein the wheel-chair (1) is collapsible in the axial direction of the rear wheels (12).

9. Vehicle for the disabled according to claim 1, wherein the cycle frame (2) is the rear wheel frame of a single-tube folding cycle which is connected with the steering bearing (35) through an arm (3).

10. Vehicle for the disabled according to claim 9, wherein the arm (3) has at the end remote from the steering bearing (35) a frame coupling (36) which is rigidly couplable with the rear wheel frame (2) in the region of the pedal bearing (28).

11. Vehicle for the disabled according to claim 10, wherein the frame coupling (36) is a folding hinge.

12. Vehicle for the disabled according to claim 1, wherein two cross-members (38, 39) which are connectable with the wheel-chair chassis (11) through coupling elements (40) are articulated to the steering bearing (35) with spacing one above the other.

13. Vehicle for the disabled according to claim 12, wherein the one cross-member (38) is detachably couplable with the wheel-chair chassis (11) and the other cross-member (39) is couplable so that it is vertically displaceable.

14. Vehicle for the disabled according to claim 12 or 13, wherein the coupling elements (40) are secured to vertical struts (18) of the wheel-chair chassis (11).

15. Vehicle for the disabled according to claim 14, wherein the coupling elements (40) are lockable forks, clips or brackets.

16. Vehicle for the disabled according to claim 15, wherein the two coupling elements (40) are displaceable in the transverse direction on the cross-member (39).

* * * * *